(12) United States Patent
Komiya et al.

(10) Patent No.: US 10,889,328 B2
(45) Date of Patent: Jan. 12, 2021

(54) FRONT SUBFRAME STRUCTURE

(71) Applicant: MAZDA MOTOR CORPORATION, Hiroshima (JP)

(72) Inventors: Katsuyuki Komiya, Hiroshima (JP); Yasushi Ishikawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 111 days.

(21) Appl. No.: 16/346,757

(22) PCT Filed: Oct. 27, 2017

(86) PCT No.: PCT/JP2017/038928
§ 371 (c)(1),
(2) Date: May 1, 2019

(87) PCT Pub. No.: WO2018/092549
PCT Pub. Date: May 24, 2018

(65) Prior Publication Data
US 2019/0300059 A1 Oct. 3, 2019

(30) Foreign Application Priority Data

Nov. 17, 2016 (JP) ................................ 2016-224333

(51) Int. Cl.
*B60J 7/00* (2006.01)
*B62D 21/15* (2006.01)
(Continued)

(52) U.S. Cl.
CPC ........... *B62D 21/155* (2013.01); *B62D 21/00* (2013.01); *B62D 21/11* (2013.01); *B60R 19/24* (2013.01)

(58) Field of Classification Search
CPC ........... A61B 2560/0219; A61B 5/686; A61M 2205/3368; A61M 2205/3538;
(Continued)

(56) References Cited

U.S. PATENT DOCUMENTS 9,180,913 B2 * 11/2015 Ameloot .............. B62D 21/152
9,381,941 B2 * 7/2016 Segawa ................ B62D 25/082
(Continued)

FOREIGN PATENT DOCUMENTS

DE 102011009120 A1 8/2011
JP 2002-200988 A 7/2002
(Continued)

OTHER PUBLICATIONS

International Search Report issued in PCT/JP2017/038928; dated Nov. 28, 2017.
(Continued)

*Primary Examiner* — Kiran B Patel
(74) *Attorney, Agent, or Firm* — Studebaker & Brackett PC

(57) ABSTRACT

A front subframe structure includes a subframe body and a pair of right and left longitudinal members. The subframe body includes an arm front-side supporting portion, an arm rear-side supporting portion, and a detaching portion. Each of the longitudinal members has, in the rear part thereof, a bent portion that is further in the vehicle width direction outer side with respect to the arm front-side supporting portion. A lower arm has, in the rear part thereof, a longitudinally extending portion. The rear face portion of the bent portion, and the front face portion which is in the front side of the longitudinally extending portion of the lower arm extend substantially parallel to each other along the vehicle width direction. A reinforcing portion is provided on a face of the rear face portion of the bent portion, the face opposing
(Continued)

the front face portion of the longitudinally extending portion.

11 Claims, 6 Drawing Sheets

(51) Int. Cl.
  *B62D 21/11* (2006.01)
  *B62D 21/00* (2006.01)
  *B60R 19/24* (2006.01)

(58) Field of Classification Search
  CPC ........ A61M 2205/8243; G09G 3/2022; G09G 2300/0842; G09G 2300/0809; G09G 2300/0426; B62D 21/11
  See application file for complete search history.

(56) References Cited

U.S. PATENT DOCUMENTS

| | | | |
|---|---|---|---|
| 9,422,007 B2* | 8/2016 | Suzuki | B62D 21/155 |
| 9,567,009 B2* | 2/2017 | Asano | B62D 21/11 |
| 9,751,565 B2* | 9/2017 | Tatsuwaki | B62D 21/11 |
| 9,988,091 B2* | 6/2018 | McConnell | B62D 21/02 |
| 10,654,525 B2* | 5/2020 | Komiya | B62D 21/155 |
| 2002/0033594 A1 | 3/2002 | Yamamoto et al. | |
| 2011/0198889 A1 | 8/2011 | Takeshita et al. | |
| 2012/0181803 A1* | 7/2012 | Snell | B62D 21/155 |
| | | | 293/133 |
| 2012/0248820 A1* | 10/2012 | Yasui | B60R 19/34 |
| | | | 296/187.09 |
| 2013/0099461 A1 | 4/2013 | Otani et al. | |
| 2014/0252739 A1 | 9/2014 | Otani et al. | |
| 2015/0084375 A1* | 3/2015 | Asano | B62D 25/088 |
| | | | 296/187.09 |
| 2016/0107695 A1* | 4/2016 | Lee | B62D 21/152 |
| | | | 296/187.09 |
| 2016/0207568 A1* | 7/2016 | Natsume | B62D 21/06 |
| 2016/0347374 A1* | 12/2016 | Miyamoto | B62D 21/152 |
| 2017/0057547 A1* | 3/2017 | Taguchi | B62D 21/11 |
| 2018/0265135 A1* | 9/2018 | Komiya | B62D 21/06 |
| 2019/0039652 A1* | 2/2019 | Kamei | B62D 21/11 |
| 2019/0322164 A1* | 10/2019 | Sasaki | B60K 1/04 |
| 2020/0102013 A1* | 4/2020 | Sakai | B62D 21/02 |

FOREIGN PATENT DOCUMENTS

| | | |
|---|---|---|
| JP | 2014-144714 A | 8/2014 |
| JP | 5949600 B2 | 7/2016 |
| WO | 2012/001909 A1 | 1/2012 |

OTHER PUBLICATIONS

Extended European Search Report issued by the European Patent Office dated Oct. 17, 2019, which corresponds to EP17871226.1-1013 and is related to U.S. Appl. No. 16/346,757.

* cited by examiner

FRONT SUBFRAME STRUCTURE

TECHNICAL FIELD

The present disclosure relates to a front subframe structure of a vehicle.

BACKGROUND ART

Conventionally, a structure is known in which a front subframe (hereinafter referred to as "subframe") that supports a suspension, a steering mechanism, a power train, and the like is provided below a pair of right and left front side frames extending in a longitudinal direction of a vehicle in the front part of the vehicle. In the structure, in an event of head-on collision of the vehicle, the front side frame deforms to absorb collision energy and in addition the subframe supplementarily absorbs the collision energy.

Another subframe structure is known that is made strong to raise the rigidity for supporting a wheel during driving but is configured to detach a rear end of the subframe from a vehicle body in a period from the middle to the later part of head-on collision of a vehicle to avoid the strong subframe hindering the deformation of the front side frame.

For example, Patent Literature 1 proposes a structure in which the subframe is detached from a vehicle body by bending the rear end portion of the subframe in a vehicle width direction of a vehicle using the load produced by the head-on collision to pull out a fastening member (a bolt).

The subframe provided in a front vehicle body structure of the vehicle disclosed in Patent Literature 1 includes a subframe body having a pair of right and left forward projecting portions (a part of the rear portion (41e) of the longitudinal member(front-rear member) (41) further in the rear side with respect to a lower arm attaching portion (41a)) that projects forward, and a pair of right and left longitudinal members (each is a front portion (41c) and a bent portion (41d) of the longitudinal member (41)) that extends from the forward projecting portions further in the front side via a joint portion (a part of the rear portion (41e) of the longitudinal member (41) further in the front side with respect to the lower arm attaching portion (41a)). An arm front-side supporting portion (the lower arm attaching portion (41a)) that supports, via a bush, the front part (a front joint portion (53)) of the lower arm constituting a suspension is provided on the forward projecting portion in the front part of the subframe body. An arm rear-side supporting portion (a fastening portion (45)) that supports, via a bush, the rear part of the lower arm, like the front part, is provided on the rear part of the subframe body.

To raise the load transferability in the head-on collision of a vehicle, the subframe disclosed in Patent Literature 1 is configured such that, in an event of head-on collision, a collision load transferred from the longitudinal member is branched into a load that is transferred from the forward projecting portion, circumventing the lower arm, to bend the rear end portion of the subframe in the vehicle width direction and a load that is transferred via the lower arm as the rear end of the longitudinal member, which is axially compressed and deformed to move rearward, contacts the lower arm and causes a fastening member (a bolt) to be pulled out at the arm rear-side supporting portion. In the structure, these two types of load are used to surely detach the subframe from the vehicle body in an event of head-on collision of the vehicle.

The subframe disclosed in Patent Literature 1 however has a room for improvement in efficiently transferring the load from the bent portion via the lower arm. This is because the subframe is shaped to be further in the vehicle width direction inner side toward the rear side along the bent portion, the joint portion, and the forward projecting portion, and similarly the front rim of the lower arm is shaped to circumvent the subframe and to incline further in the vehicle width direction inner side toward the rear side. Thus, in an event of head-on collision, even if the bent portion moving rearward contacts the lower arm, it is unlikely to create a reliable abutment between the rear face of the bent portion and the front face of the lower arm.

In Patent Literature 2, an automobile suspension device is proposed that has a reinforcement (a reinforcing member) provided to a bent portion of a first frame of a suspension frame to reinforce the bent portion.

The reinforcement is however provided to reinforce not only the bent portion but also the first frame, which is shaped to incline further in the vehicle width direction inner side toward the rear side, from the bent portion to immediately near a front of a supporting bracket (18) for the lower arm. It is clear that transfer of the collision load is difficult because when the bent portion is bent and moves rearward to contact the supporting bracket (18) of the lower arm in an event of head-on collision of a vehicle, it is unlikely that the bent portion contacts the front face of the lower arm. That is, in Patent Literature 2, the reinforcement is provided on the bent portion to raise transferability of the load produced by the head-on collision of a vehicle to the subframe body (a second frame). Patent Literature 2 does not disclose idea of providing the reinforcement to the bent portion to raise transferability of the collision load from the bent portion to the lower arm front part and transferability of the collision load from the lower arm front part to the arm rear-side supporting portion.

CITATION LIST

Patent Literature

Patent Literature 1: JP 5949600 B
Patent Literature 2: JP 2002-200988 A

SUMMARY OF INVENTION

An object of the present disclosure is to provide a front subframe structure that has a shape circumventing a power train but has a higher rigidity (natural frequency) and improved transferability of head-on collision load (reinforcement of a bent portion and improvement of transferability of a load to a lower arm).

A front subframe structure according to an aspect of the present disclosure includes a subframe body that supports, in a front part of a vehicle, suspensions disposed below a pair of right and left front side frames each extending in a longitudinal direction of the vehicle, and a pair of right and left longitudinal members each extending forward from the subframe body.

The subframe body includes an arm front-side supporting portion, an arm rear-side supporting portion, and a detaching portion, the arm front-side supporting portion and the arm rear-side supporting portion supporting a front part and a rear part of a lower arm constituting the suspensions, the detaching portion detaching the subframe body from each of the front side frames using a load from a subframe moving rearward or a load from the lower arm moving rearward.

Each of the longitudinal members includes a bent portion provided at a rear part of the longitudinal member and further in an outer side along a vehicle width direction outer side with respect to the arm front-side supporting portion.

The lower arm has a longitudinally extending portion extending in the longitudinal direction which is provided in a rear part of the lower arm.

A rear face portion of the bent portion and a front face portion which is in a front side of the vehicle of the longitudinally extending portion of the lower arm extend substantially parallel to each other along the vehicle width direction.

A reinforcing portion is provided on a face of the rear face portion of the bent portion, the face opposing the front face portion of the longitudinally extending portion.

DESCRIPTION OF EMBODIMENTS

An embodiment of the present disclosure will now be described below with reference to the drawings.

It should be noted that the embodiment described below is one aspect of the present disclosure. The embodiment is disclosed by means of illustration and not by means of limitation except for an essential configuration.

Embodiment

A front subframe structure of a vehicle according to an embodiment will be described using FIGS. 1 to 6.

Figure 1:
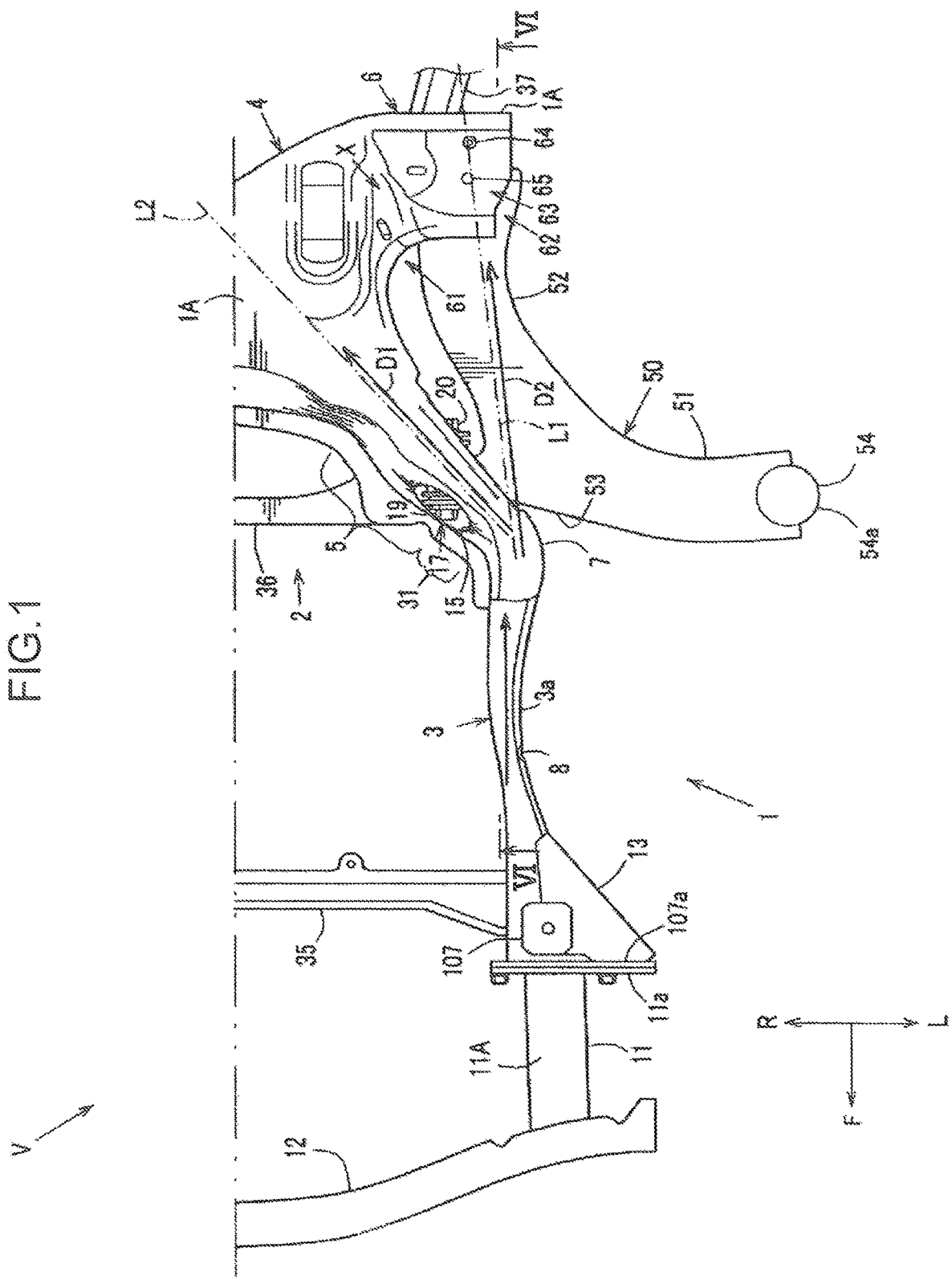
FIG. 1 is a schematic plan view illustrating a portion of a left side of a front subframe structure according to an embodiment.
Figure 2:
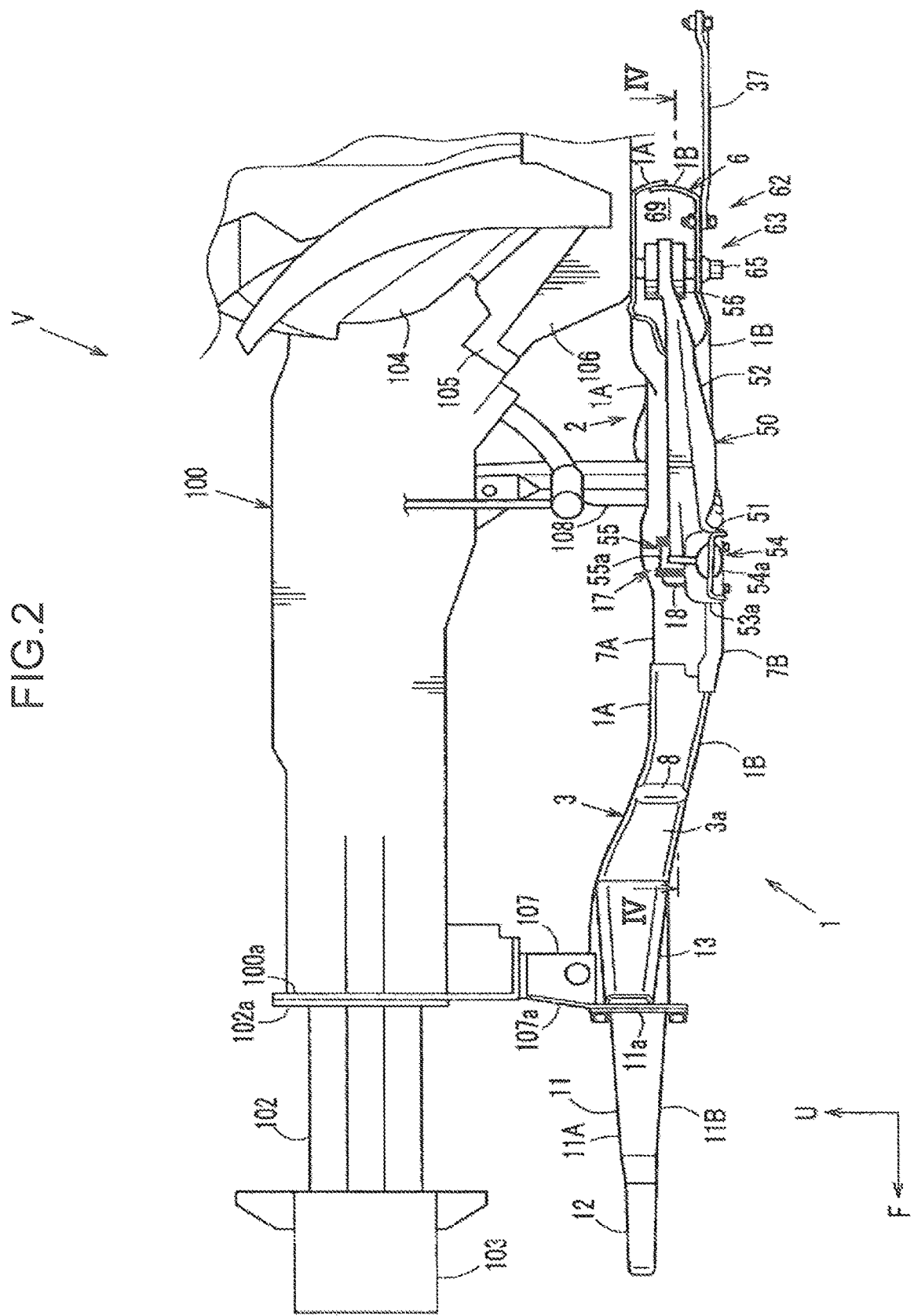
FIG. 2 is a schematic side view illustrating the front subframe structure according to the embodiment.
Figure 3:
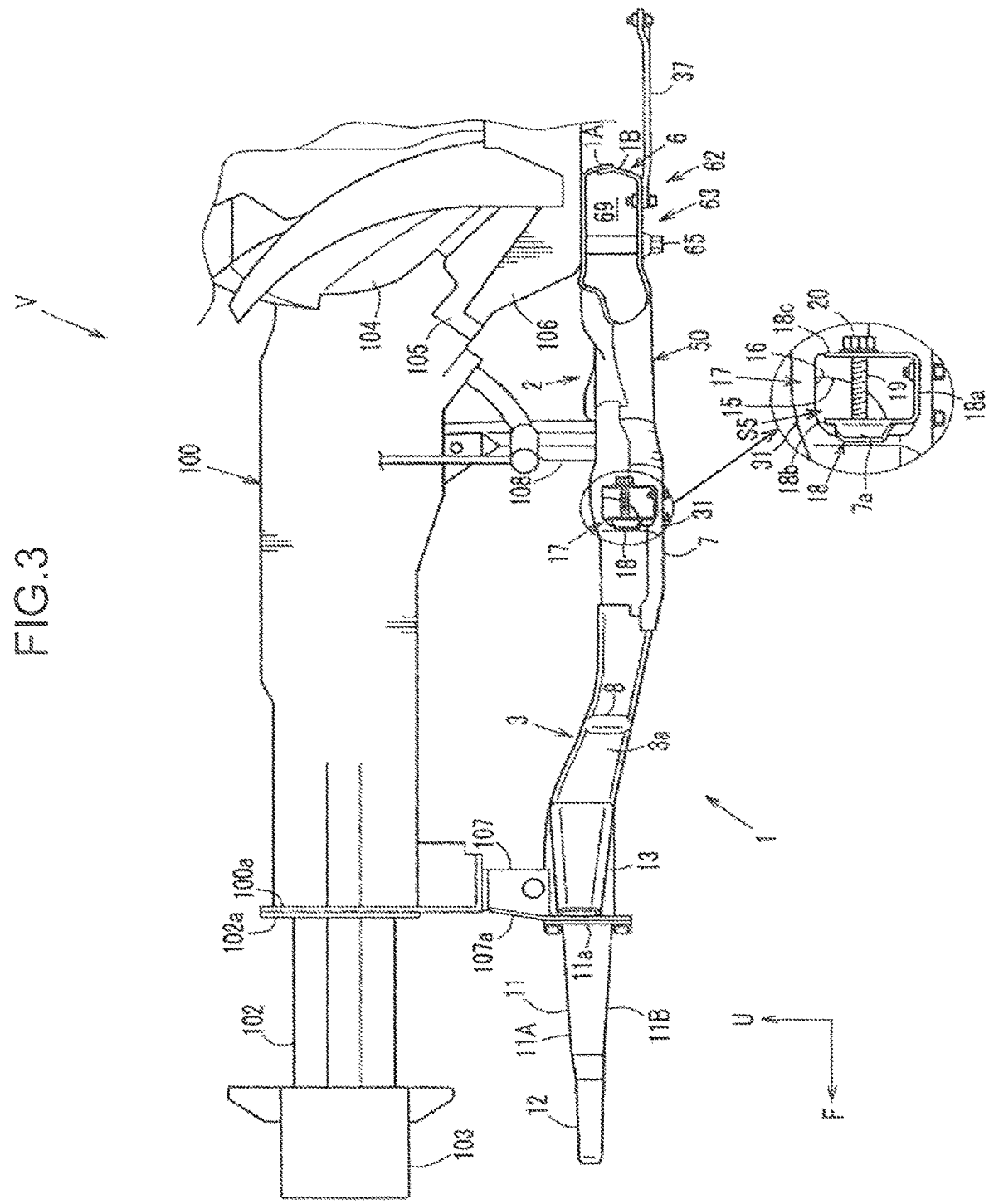
FIG. 3 is a schematic side view illustrating the front subframe structure illustrated in FIG. 2 with a lower arm removed.
Figure 4:
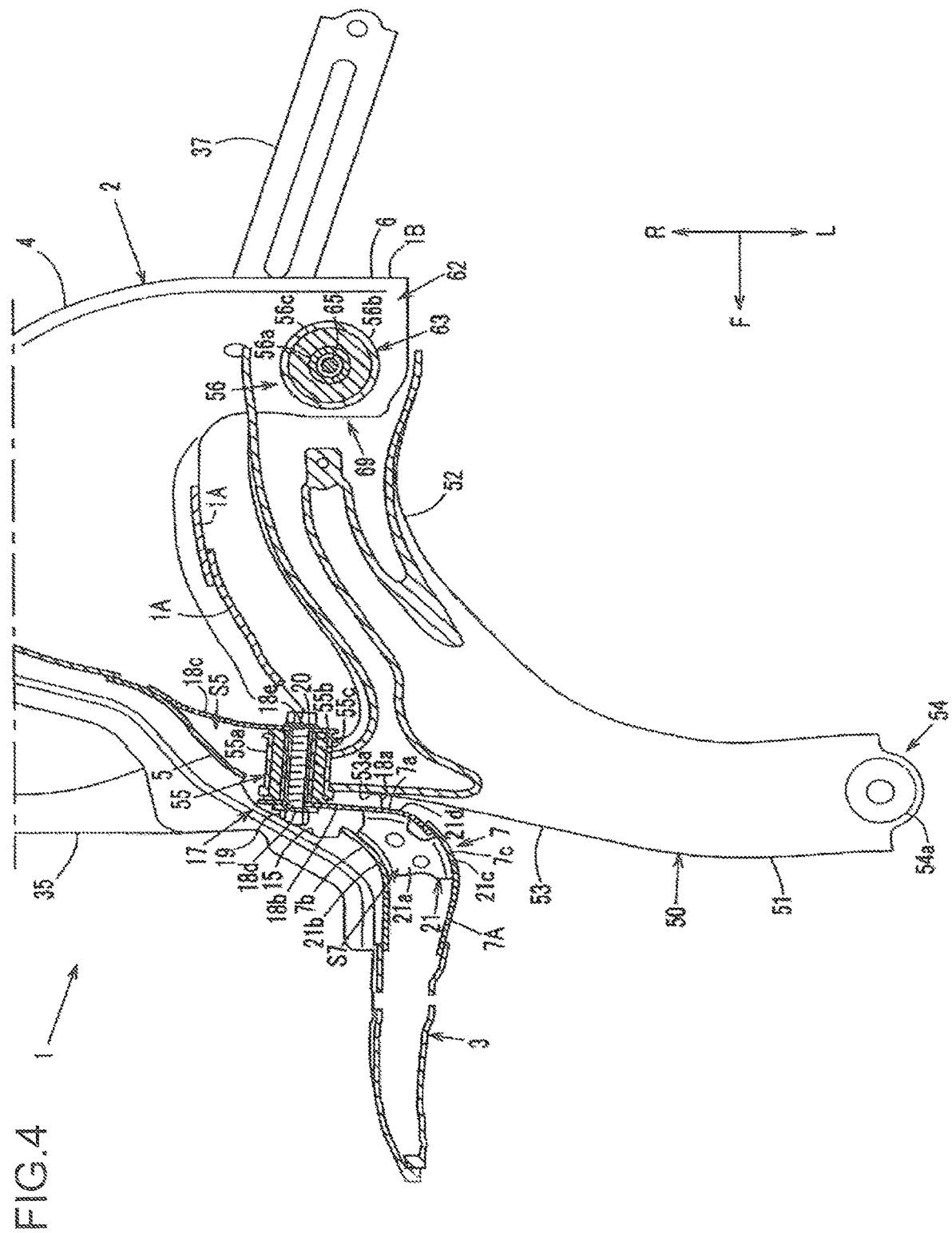
FIG. 4 is a schematic sectional view illustrating a portion of a cross-section of the front subframe structure illustrated in FIG. 2 taken along line IV-IV.
Figure 5:
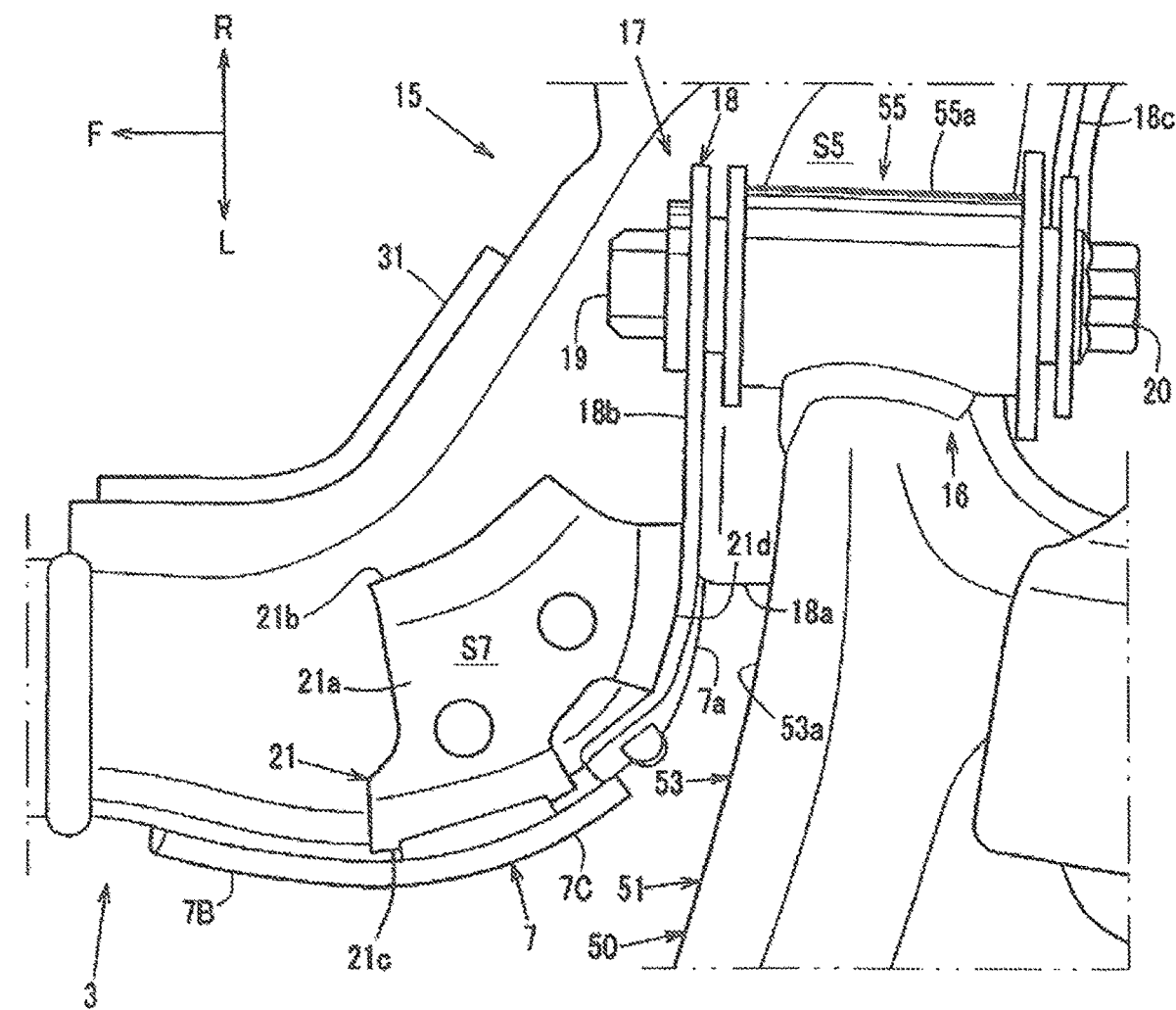
FIG. 5 is a schematic plan view illustrating a structure in which a rear face of a bent portion and a front face of the lower arm oppose each other.
Figure 6:
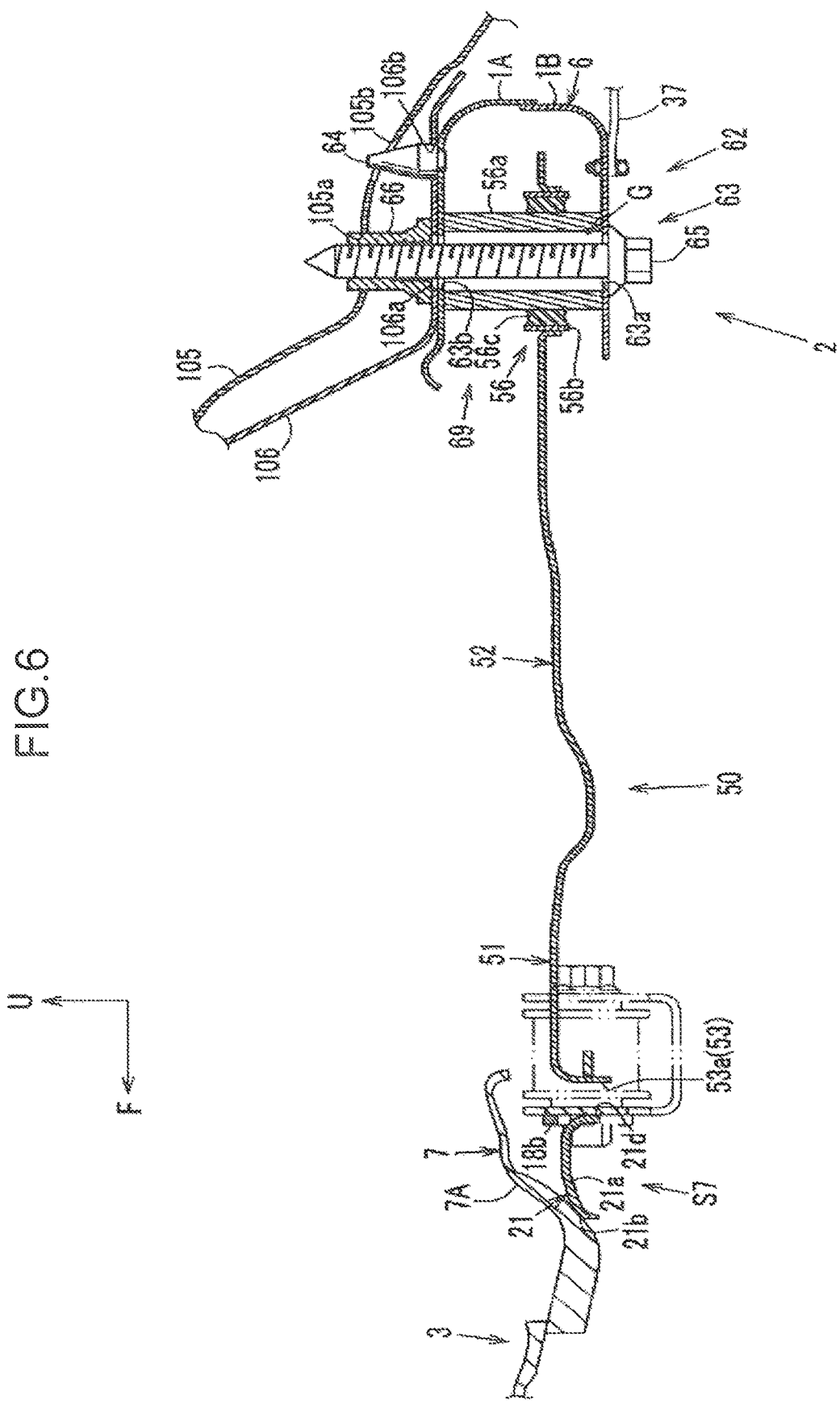
FIG. 6 is a schematic sectional view illustrating a portion of a cross-section of the front subframe structure illustrated in FIG. 1 taken along line VI-VI.

FIG. 1 is a schematic plan view illustrating a portion of a left side of the front subframe structure according to the embodiment. FIG. 2 is a schematic side view illustrating a portion of the left side of the front subframe structure of the embodiment. FIG. 3 is a schematic side view illustrating the front subframe structure with a lower arm removed. FIG. 4 is a schematic sectional view illustrating a portion of a cross-section of the front subframe structure illustrated in FIG. 2 taken along line IV-IV. FIG. 5 is a schematic plan view illustrating a structure in which a rear face of a bent portion and a front face of the lower arm oppose each other, where the figure is a schematic enlarged plan view with an upper panel of the subframe removed. FIG. 6 is a schematic sectional view illustrating a portion of a cross-section of the front subframe structure illustrated in FIG. 1 taken along line VI-VI.

In the drawings, an arrow F indicates the front side of the vehicle, an arrow R indicates the right side of the vehicle, an arrow L indicates the left side of the vehicle, and an arrow U indicates the upper side of the vehicle. Since the front subframe structure according to the embodiment is symmetric along the right-and-left direction, description is made based on the left side of the vehicle and description on the right side of the vehicle is omitted.

A vehicle V according to the embodiment is a compact car having a short front nose. As illustrated in FIGS. 2 and 3, a front subframe structure 1 (hereinafter referred to as "subframe 1") supporting a pair of right and left lower arms 50 constituting a portion of suspensions is provided in the front part of the vehicle V and below a pair of right and left front side frames 100 extending in a longitudinal direction of the vehicle V.

The front side frame 100 has a cylindrical body extending in the longitudinal direction and having a closed cross-section. An upper crash can 102 is attached to the front end of the front side frame 100 via a flange 100a and a flange 102a disposed adjacent to the upper crash can 102.

The upper crash can 102 has a cylindrical body that extends in the longitudinal direction, has a closed cross-section, and continues to the front part of the front side frame 100. The front ends of the right and left upper crash cans 102 are connected to each other via a bumper reinforcement 103 extending in a vehicle width direction.

As illustrated in FIGS. 1 to 3, the front end of the subframe 1, which will be described later, is connected to the bottom face of the front side frame 100 via a front end supporting member 107 and the flange 100a, and the middle portion in the longitudinal direction of the subframe 1 is connected by a fastening member (not shown) via a mid-supporting member 108 (see FIGS. 2 and 3).

A dash panel 104 that partitions a container space containing a power train, such as an engine, from a vehicle room is provided in the rear side, with respect to the vehicle, of the front side frame 100. The rear end of the front side frame 100 is connected to the front face of the dash panel 104. A floor frame 105 extending in the longitudinal direction from the rear end of the front side frame 100 is provided on the lower part of the dash panel 104. A gusset 106 having a wedge shape in a side view is joined and fixed to a lower part of the floor frame 105, and the floor frame 105 and the gusset 106 together form a closed cross-section. The rear end of the subframe 1 described above is joined via a fastening unit 63 to the floor frame 105 and the gusset 106 provided on a vehicle body.

As illustrated in FIGS. 1 to 3, the subframe 1 has a square shape including a subframe body 2, a pair of right and left longitudinal members 3 extending forward from the subframe body 2 via a joint portion 31, a front cross member 35 (see FIG. 1) that interconnects the front parts of the longitudinal members 3 along the vehicle width direction, and a central cross member 36 (see the same figure) that is provided in front of the subframe 1 as a connecting member.

The subframe body 2 and the longitudinal members 3 include an upper panel 1A that forms the upper face and is bent so as the rim of the upper face to suitably extend downward, and a lower panel 1B that forms the lower face and is bent so as the rim of the lower face to suitably extend upward. The opposing portions of the lower panel 1B and the upper panel 1A are joined to form the subframe body 2 and the longitudinal member 3 into a hollow shape.

As illustrated in FIG. 1, the subframe body 2 includes a sus-cross 4 (suspension cross member 4) extending in the vehicle width direction, a pair of right and left forward projecting portions 5 projecting forward from the right and left front parts of the subframe body 2, and a vehicle width direction outward projecting portion 6 that extends vehicle width direction outward from the rear part of the subframe body 2.

In the embodiment, the portion, further in the front side, of the forward projecting portion 5 projects further in the vehicle width direction outer side to be substantially horizontal, and the vehicle width direction outward projecting portion 6 projects vehicle width direction outward in a direction substantially parallel to the vehicle width direction to be substantially horizontal.

The longitudinal member 3 is joined via the joint portion 31 to the front end of the forward projecting portion 5. Describing in more detail, the joint portion 31 continuously extends vehicle width direction outward from the front end of the forward projecting portion 5 to become substantially linear toward the front side, that is, toward the direction in which the forward projecting portion 5 projects. The joint portion 31 is provided further in the front side with respect to an arm front-side supporting portion 17, which will be described later, and is integrated with the longitudinal member 3. The longitudinal member 3 extends further in the front side from the front end of the joint portion 31 to be substantially parallel to the longitudinal direction. A bent portion 7 that is bent from the joint portion 31 is provided on the rear part of the longitudinal member 3.

In the embodiment, as illustrated in FIG. 2, the cross-section, orthogonal to the longitudinal direction (front-and-rear direction), of the front end of the longitudinal member 3 at least partially overlaps the cross-section, orthogonal to the longitudinal direction, of the rear end of the longitudinal member 3 in a front view.

As illustrated in FIGS. 1 to 3, a recessed bead 8 is provided in a side face 3a, which is a vertical wall in the vehicle width direction outer side, of the longitudinal member 3. The recessed bead 8 is provided in a middle portion, in the longitudinal direction, of the side face 3a to serve as a bend-promoting portion that promotes the middle portion of the longitudinal member 3 to be deformed to bend vehicle width direction inward in an event of off-set collision at the front face of the vehicle V.

The recessed bead 8 is recessed in the vehicle width direction inner side from the surface of the side face 3a, which is in the vehicle width direction outer side, of the longitudinal member 3, and has a shape elongate along the up-and-down direction.

As illustrated in the figures, a front end supporting member 107 is joined and fixed to the front end of the longitudinal member 3 to project upward, and a front flange 107a is provided on the front face of the front end supporting member 107. A lower crash can 11 is attached to the front face of the lower part of the front flange 107a via a plate-like flange 11a.

As illustrated in FIG. 2, the lower crash can 11 has a square frustum shape having an upper panel 11A as an upper face and a lower panel 11B as a lower face, and the rear end of each of the upper panel 11A and the lower panel 11B is joined and fixed to the flange 11a. Thus, the lower crash can 11 is compressible and deformable by a collision load input from the front side. The reference sign 12 in FIGS. 1 to 3 indicates a lower bumper-beam that interconnects the front ends of a pair of right and left lower crash cans 11 along the vehicle width direction.

As illustrated in FIGS. 1 to 3, the front flange 107a included in the front end supporting member 107 has a shape gradually extending vehicle width direction outward from the top end to the lower part, and the lower part extends vehicle width direction outward substantially as far as to the vehicle width direction outer end of the lower bumper-beam 12 (see FIG. 1). A vehicle width direction outward extending member 13 is provided in a corner portion which is at the front part of the longitudinal member 3 and formed by a vehicle width direction outward extending portion of the lower part of the front flange 107a and the side face 3a, which is in the vehicle width direction outer side, of the longitudinal member 3. The vehicle width direction outward extending member 13 has a triangular pillar shape having a triangular shape extending vehicle width direction outward toward the front side in a plan view and a thickness along the up-and-down direction. The front end of the vehicle width direction outward extending member 13 is joined to the rear face of the vehicle width direction outward extending portion of the front flange 107a, and the vehicle width direction inner end of the vehicle width direction outward extending member 13 is joined to the front part of the side face 3a, which is in the vehicle width direction outer side, of the longitudinal member 3.

As illustrated in enlarged portions in FIGS. 1 and 3, FIGS. 4, and 5, the front part of the forward projecting portion 5 includes the arm front-side supporting portion 17 that rotatably supports the front part of the lower arm 50 via a front joint portion 55 (front bush 55) (see FIGS. 4 and 5). The substantially entire portion of the arm front-side supporting portion 17 is housed in an internal space S5 formed by the lower panel 1B and the upper panel 1A of the forward projecting portion 5.

As illustrated in the enlarged portion in FIG. 3, the arm front-side supporting portion 17 includes an arm front-side supporting bracket 18, a bolt 19, and a nut 20, where the bolt 19 and the nut 20 rotatably support the front joint portion 55 of the lower arm 50.

As illustrated in FIGS. 1, 3, and 5, a front face opening 15 that is opened to the front side and the vehicle width direction inner side is provided in the front face of the forward projecting portion 5 between the upper panel 1A and the lower panel 1B. As illustrated in FIGS. 3 and 5, a rear face opening 16 that is opened to the rear side and the vehicle width direction outer side is provided in the rear face of the forward projecting portion 5.

The front face opening 15 is a service hole (work access hole) mainly used when the bolt 19 is fastened for rotatably supporting the front joint portion 55 into the arm front-side supporting bracket 18.

The rear face opening 16 is continuously opened from the rear face portion of the front part of the forward projecting portion 5 to the rear face portion of the joint portion 31 and the rear face portion of the bent portion 7. The opened portion in the rear face portion of the front part of the forward projecting portion 5 is opened to the vehicle width direction outer side. As illustrated in FIGS. 1, 4, and 5, the vehicle width direction inner side of a vehicle width direction extending arm 51, which will be described later, of the lower arm 50 is inserted through the opened portion into the internal space S5 of the forward projecting portion 5.

As illustrated in FIGS. 3 to 5, the arm front-side supporting bracket 18 includes a base part 18a, a front wall 18b rising from the front end of the base part 18a, and a rear wall 18c rising from the rear end of the base part 18a which are integrated to form a U-shape opened upward in a side view (see the enlarged view in FIG. 3). The base part 18a is disposed on the lower face of the lower panel 1B of the front part of the forward projecting portion 5. The base part 18a is fastened and fixed to the lower face by a bolt and a nut.

As illustrated in FIGS. 4 and 5, the front wall 18b extends vehicle width direction outward across the internal space S5 of the forward projecting portion 5 from the joint portion 31 to the rear part of the bent portion 7 so as to plug the opened portion of the rear face opening 16 existing in a place where the rear face portions of the joint portion 31 and the bent portion 7 are to be provided. The vehicle width direction outer end of the front wall 18b is joined to the rear end of the side face 7c, which is in the vehicle width direction outer side of the bent portion 7. The front wall 18b thus forms the joint portion 31 and a rear face portion 7a of and the bent portion 7. The front wall 18b linearly extends substantially parallel to the vehicle width direction from the joint portion 31 to the bent portion 7. The rear face portion 7a of the bent portion 7 formed by the front wall 18b extends substantially parallel to the vehicle width direction.

The rear wall 18c extends across the internal space S5 of the forward projecting portion 5 extending in the longitudinal direction to extend in the vehicle width direction inner side. The vehicle width direction inner end of the rear wall 18c is joined to the rear face of the front face portion of the forward projecting portion 5.

As illustrated in FIG. 4, insertion holes 18d and 18e in which the bolt 19 is inserted are respectively provided in a portion of the front wall 18b and a portion of the rear wall 18c, the portions opposing each other along the longitudinal direction, that is, overlapping each other along the vehicle width direction. The front wall 18b and the rear wall 18c are located respectively at substantially middle positions, in the vehicle width direction, on the opposing portions so as to be in exactly the same location when viewed along the longitudinal direction.

As illustrated in FIGS. 2, 3, and 6, the vehicle width direction outward projecting portion 6 provided in the rear part of the subframe body 2 has a hollow shape formed by the upper panel 1A and the lower panel 1B and projecting vehicle width direction outward. An opening 69 is provided in the front face and the vehicle width direction outer face of the vehicle width direction outward projecting portion 6 to be opened to the front side and continuously to the vehicle width direction outer side, where the opening 69 is formed to cut into the upper panel 1A and the lower panel 1B.

As illustrated in FIGS. 1 to 3, 4, and 6, the vehicle width direction outward projecting portion 6 includes a low-rigidity portion 61 (a bend-promoting portion) that has a rigidity lower than other portions, and a detaching portion 62 that detaches the subframe body 2 from the front side frame 100 using a load from the subframe 1 moving rearward or a load from the lower arm 50 moving rearward in an event of head-on collision.

As illustrated in FIG. 1, the low-rigidity portion 61 is formed in a region X between a virtual line L1 connecting the bent portion 7 of the longitudinal member 3 and the detaching portion 62 and a virtual line L2 extending rearward along the extending direction of the forward projecting portion 5. In the embodiment, the region X is located further in the vehicle width direction inner side with respect to the detaching portion 62 of the vehicle width direction outward projecting portion 6, and provided between the proximal portion of the detaching portion 62 and the proximal portion of the vehicle width direction outward projecting portion 6.

As illustrated in FIGS. 1 and 6, the detaching portion 62 is provided with the fastening unit 63 that fastens and fixes the rear end of the lower arm 50 together with the subframe 1 to the vehicle body, and a reference pin 64 that is attached further in the rear side with respect to the fastening unit 63 to be fit into the vehicle body.

As illustrated in FIG. 6, the fastening unit 63 includes a bolt 65 and a weld nut 66 that serve as the fastening member for fastening a part to the gusset 106 provided on the vehicle body. The fastening unit 63 further has insertion holes 63a and 63b respectively drilled in the upper panel 1A and the lower panel 1B to insert the bolt 65 therein. The insertion holes 63a and 63b are disposed at where the fastening unit 63 is located so as to overlap each other in the up-and-down direction. The bolt 65 of the fastening unit 63 rotatably supports a rear joint portion 56 (a rear bush 56) provided in the rear end of the lower arm 50. That is, the fastening unit 63 also serves as an arm rear-side supporting portion that supports the rear part of the lower arm 50 via the rear joint portion 56.

The reference pin 64 is attached to the fastening unit 63 and further in the rear side with respect to the insertion hole 63b. The distal end of the reference pin 64 has a substantially conical shape protruding upward to point the gusset 106.

As illustrated in FIGS. 4 to 6, an internal space S7 is provided in the bent portion 7, which is provided at the rear end of the longitudinal member 3, and between an upper panel 7A (see FIG. 6) and a lower panel 7B (see FIG. 5). A reinforcing gusset (a reinforcing portion) 21 made of a steel plate is provided in the internal space S7. The reinforcing gusset 21 is integrally formed with a base plate portion 21a extending horizontally, a vehicle width direction inner flange 21b extending vertically downward from the vehicle width direction inner rim of the base plate portion 21a, a vehicle width direction outer flange 21c extending vertically downward from the vehicle width direction outer front rim of the base plate portion 21a, and a rear flange 21d extending vertically downward from the rear rim of the base plate portion 21a.

As illustrated in FIG. 4, the vehicle width direction inner flange 21b is joined to a boundary section 7b which is an inner corner portion of the bent portion 7 provided as a boundary between an inner side face portion and the front face portion. As illustrated in FIGS. 4 and 5, the vehicle width direction outer flange 21c is joined to the outer side face 7c of the bent portion 7. The rear flange 21d is joined to the rear face portion 7a of the bent portion 7, that is, to a vehicle width direction outward extending portion of the front wall 18b of the arm front-side supporting bracket 18 constituting the rear face portion 7a.

The reinforcing gusset 21 is provided in the curved corner portion of the bent portion 7 in such a manner. That is, the reinforcing gusset 21 is provided only to the bent portion 7 and is not provided to reach the joint portion 31, which is further in the vehicle width direction inner side with respect to the bent portion 7, and the rim of the front face opening 15, for example, of the forward projecting portion 5. As illustrated in FIG. 4, the reinforcing gusset 21 is located to be shifted to the vehicle width direction outer side from the arm front-side supporting portion 17.

Furthermore, the vehicle width direction inner flange 21b and the vehicle width direction outer flange 21c are both joined to a middle position, in the up-and-down direction, of the downward bent portion of the upper panel 1A of the bent portion 7. In this manner, as illustrated in FIG. 6, the base plate portion 21a of the reinforcing gusset 21 is disposed substantially horizontal at the same height as the lower arm 50, and the rear flange 21d of the reinforcing gusset 21 is disposed at a position, overlapping along the up-and-down direction, (that is, at the same height as) a front face portion 53a which is disposed in the front side of a longitudinally extending arm 52 (see FIG. 4), where the front face portion 53a is a part of a vehicle width direction extending front face portion 53 of the lower arm 50. The longitudinally extending arm 52 and the front face portion 53 will be described later.

As illustrated in FIGS. 1 and 4, the lower arm 50 has the vehicle width direction extending arm 51 and the longitudinally extending arm 52 which are integrated to form a T-like shape in a plan view, where the vehicle width direction extending arm 51 is a front part of the lower arm 50 extending substantially parallel to the vehicle width direction and the longitudinally extending arm 52 extends toward the rear side from the substantially middle position, in the vehicle width direction, of the vehicle width direction extending arm 51.

As illustrated in FIGS. 1, 2, and 4, a knuckle supporting portion 54 is provided at the vehicle width direction outer end of the vehicle width direction extending arm 51 to connect a part to a knuckle arm (not shown) that supports a wheel via a ball joint 54*a*.

As illustrated in FIGS. 4 and 5, the front joint portion 55 (the front bush 55) is attached to the vehicle width direction inner end of the vehicle width direction extending arm 51. The front joint portion 55 has an outer cylinder 55*a*, an inner cylinder 55*b*, and an annular rubber member 55*c* (a bush body) made of an elastic body, where the inner cylinder 55*b* is disposed inside the outer cylinder 55*a* with a gap therebetween and the rubber member 55*c* is disposed between the outer cylinder 55*a* and the inner cylinder 55*b*. The outer face of the outer cylinder 55*a* is integrally fixed to the vehicle width direction inner end of the vehicle width direction extending arm 51 (see FIG. 5).

In the embodiment, the bolt 19 extending in the longitudinal direction is provided in the arm front-side supporting portion 17 of the subframe body 2. The bolt 19 is inserted in the insertion holes 18*d* and 18*e* and the hollow of the inner cylinder 55*b* of the front joint portion 55, and the nut 20 is tightly screwed onto the bolt 19. As illustrated in FIGS. 4 and 5, the vehicle width direction inner side of the vehicle width direction extending arm 51 is inserted through the rear face opening 16, which is opened to the vehicle width direction outer side, into the internal space S5 of the forward projecting portion 5, and the front joint portion 55 is swingably supported by the arm front-side supporting portion 17.

The lower arm 50 is configured as illustrated in FIGS. 4 and 5 such that the position of the front joint portion 55 pivotally supported by the arm front-side supporting portion 17 and the position of the knuckle supporting portion 54 overlap each other along the longitudinal direction as illustrated in FIGS. 1, 2, and 4, and the vehicle width direction extending arm 51 extends in the vehicle width direction along the direction linearly connecting the front joint portion 55 and the knuckle supporting portion 54 (see FIG. 4).

As illustrated in FIG. 6, the front end of the lower arm 50 has the front face portion 53 extending vertically downward in a flange-shape. The front face portion 53 forms the front face portion 53*a* of the vehicle width direction extending arm 51 of the lower arm 50. As illustrated in FIGS. 3 and 4, the front face portion 53*a* of the longitudinally extending arm 52 in the front side (that is, a portion 53*a* of the front face portion 53 in front of the longitudinally extending arm 52 in the vehicle width direction) extends substantially parallel to the vehicle width direction.

The rear flange 21*d* of the reinforcing gusset 21 is joined to the front wall 18*b* so as to oppose the front face portion 53*a* positioned in the front side of the longitudinally extending arm 52 of the lower arm 50 with the front wall 18*b* of the arm front-side supporting bracket 18 disposed between the rear flange 21*d* and the front face portion 53*a* (see FIGS. 4 and 6).

As illustrated in FIGS. 4 and 5, the rear face portion 7*a* (the front wall 18*b* of the arm front-side supporting bracket 18) of the bent portion 7 and the front face portion 53*a* positioned in the front side of the longitudinally extending arm 52 of the lower arm 50 each extend substantially parallel to the vehicle width direction, so that the rear face portion 7*a* and the front face portion 53*a* are parallel to each other and oppose each other along the longitudinal direction with the front wall 18*b* therebetween.

As illustrated in FIGS. 1, 2, 4, and 6, the longitudinally extending arm 52 of the lower arm 50 is disposed at the fastening unit 63 by inserting the rear end of the longitudinally extending arm 52 through the front opening of the opening 69 of the vehicle width direction outward projecting portion 6 in between the upper panel 1A and the lower panel 1B.

As illustrated in FIGS. 2, 4, and 6, the longitudinally extending arm 52 extends rearward and substantially horizontal from the vehicle width direction middle position of the vehicle width direction extending arm 51, and the rear joint portion 56 is attached to the rear end of the longitudinally extending arm 52. As illustrated in FIGS. 4 and 6, the rear joint portion 56 includes an inner cylinder 56*a* fixed between the upper face of the upper panel 1A and the lower face of the lower panel 1B, an outer cylinder 56*b* fixed to the rear end of the lower arm 50, and an annular rubber member 56*c* disposed between the inner cylinder 56*a* and the outer cylinder 56*b*. The rear joint portion 56 is disposed such that the hollow of the inner cylinder 56*a* overlaps, in the up-and-down direction, the insertion holes 63*a* and 63*b*.

In the vehicle body as illustrated in FIG. 6, an elongate insertion hole 106*a* diagonally inclined against the longitudinal direction is drilled in the lower face of the gusset 106 and an insertion hole 105*a* is drilled in the floor frame 105, where the locations of the insertion hole 106*a* and the insertion hole 105*a* correspond to the locations of the hollow of the inner cylinder 56*a* and the insertion holes 63*a* and 63*b*. The weld nut 66 having a pipe shape and constituting the fastening unit 63 together with the bolt 65 is inserted in the insertion hole 105*a*. The weld nut 66 is positioned by the lower face of the gusset 106 and the insertion hole 105*a* of the floor frame 105 so that the seating face is placed on the periphery of the insertion hole 106*a* to be fixed.

In the embodiment, the bolt 65 is inserted in the insertion holes 106*a*, 63*a*, and 63*b* and the hollow of the inner cylinder 56*a* of the rear joint portion 56, and the weld nut 66 is tightly screwed on the bolt 65. The rear end of the lower arm 50 is thereby fixed to the gusset 106, provided on the vehicle body, together with the vehicle width direction outward projecting portion 6 of the subframe 1.

The diameter of the hollow of the inner cylinder 56*a* and the diameter of each of the insertion holes 63*a* and 63*b* are set larger than the diameter of the bolt 65, so that there is a gap G as illustrated in FIG. 6 between the fastening unit 63 and the bolt 65 and between the inner cylinder 56*a* and the bolt 65 in a fastened and fixed state described above.

As illustrated in FIG. 6, an aperture hole 105*b* and a reference hole 106*b* are drilled respectively in the floor frame 105 and the gusset 106 each at a location corresponding to the reference pin 64.

Regarding the aperture hole 105*b* and the reference hole 106*b*, the reference hole 106*b* has a diameter substantially the same as the diameter of the reference pin 64. In the fastened and fixed state described above, the reference pin 64 fits in the reference hole 106*b* substantially without a gap.

Thus, in the embodiment, the gap G described above is set larger than the gap between the reference hole 106*b* and the reference pin 64.

The reference sign 37 in FIGS. 1 to 4 and 6 indicates a brace that provides rigidity in the longitudinal direction during driving and absorbs an impact by bending deformation in an event of head-on collision of the vehicle.

The reference pin 64 and the reference hole 106*b* are respectively used as a reference pin and a reference hole for positioning the subframe 1 to the vehicle body. Specifically, when the subframe 1 is attached to the vehicle body, the reference pin 64 fits in the reference hole 106*b* of the gusset 106 provided on the vehicle body to position the fastening unit 63 to the vehicle body, thereby suitably positioning the subframe 1 to the vehicle body.

The deforming behavior of the subframe 1 in an event of head-on collision of the vehicle V according to the embodiment will now be described.

First, in an event of head-on collision of the vehicle V, the collision energy is absorbed by the upper crash can 102 (see FIG. 2) provided on the front end of the front side frame 100 (see FIG. 2) and by axial compression of the front side frame 100 by the collision load.

As for the subframe 1, the lower crash can 11 is compressively deformed by the collision load and the collision load that is not absorbed by the compressive deformation of the lower crash can 11 is input to the subframe 1, and the longitudinal member 3 of the subframe 1 is axially compressed to supplementarily absorb the collision energy.

As the longitudinal member 3 is axially compressed, the collision energy is absorbed and dissipated along a first load transfer path (see bold arrow D1 in FIG. 1) along which the collision load is transferred from the bent portion 7 at the rear end of the longitudinal member 3 and the joint portion 31 to the sus-cross 4 via the forward projecting portion 5.

In this process, a large load accompanying the collision load acts from the front side on the low-rigidity portion 61 to promote valley-fold deformation of the low-rigidity portion 61. The valley-fold deformation of the low-rigidity portion 61 causes the detaching portion 62 to deform and tilt forward.

The bent portion 7 reinforced by the reinforcing gusset 21 is not easily deformed to bend by the collision load. However, if a large collision load is input, the bent portion 7 at the rear end of the longitudinal member 3 is deformed to bend and moves rearward.

Even if the bent portion 7 is bent by the collision load in such a case, the rear face portion 7*a* (see FIGS. 4 and 5) of the bent portion 7 contacts the front face portion 53*a* of the lower arm 50 and thereby a portion of the collision load transferred from the longitudinal member 3 is transferred from the bent portion 7 to the detaching portion 62 via the lower arm 50 as indicated by bold arrow D2 in FIG. 1.

As the bent portion 7 deforms and moves rearward by the head-on collision of the vehicle, the rear face portion 7*a* of the bent portion 7 (the front wall 18*b* of the arm front-side supporting bracket 18) and the front face portion 53*a* of the lower arm 50 contact each other by the faces thereof abutting each other and the reinforcing gusset 21 pushes rearward the front face portion 53*a* of the lower arm 50 from the front side at the same height via the rear face portion 7*a* of the bent portion 7. The load is thereby reliably transferred from the bent portion 7 to the lower arm 50.

The lower arm 50 has the longitudinally extending arm 52 extending rearward provided in the rear of the vehicle width direction extending arm 51 and directly behind the front face portion 53*a* which the rear face portion 7*a* of the bent portion 7 deformed and moving rearward contacts (see FIGS. 4 and 5), so that the collision load from the bent portion 7 that has moved rearward is reliably received and is transferred rearward.

The collision load transferred along a second load transfer path (see bold arrow D2 in FIG. 1) from the bent portion 7 to the detaching portion 62 via the lower arm 50 pushes the bolt 65 and the reference pin 64 of the fastening unit 63 disposed at the detaching portion 62 to the rear side. In the embodiment, there is the gap G between the bolt 65 and the inner cylinder 56*a* of the rear joint portion 56 (see FIG. 6), so that the fastening unit 63 moves to the rear side along with the movement of the inner cylinder 56*a* to the rear side.

This causes the reference pin 64 to expand the reference hole 106*b* of the gusset 106, for example, and the supporting rigidity of the periphery of the insertion hole 63*b* is significantly reduced.

Moreover, the second load transfer path causes the detaching portion 62 to deform to tilt forward. The forward tilt of the detaching portion 62 is further promoted as the valley-fold deformation of the low-rigidity portion 61 progresses with the course of the collision of the vehicle V. In the detaching portion 62, the bolt 65 and the weld nut 66 of the fastening unit 63 are pulled out downward and rearward from the gusset 106 provided in the vehicle body by the so-called principle of leverage using the reference pin 64 as a fulcrum. The rear end of the subframe 1 is thereby detached from the vehicle body (the floor frame 105 and the gusset 106).

That is, in the embodiment, the bent portion 7 is reinforced against both the loads transferred along the first load transfer path and the second load transfer path by providing the reinforcing gusset 21 to the bent portion 7 as described above. In particular, the reinforcing gusset 21 preferentially reinforces the bent portion 7 against the load transferred along the second load transfer path, and thereby transferability of the load from the bent portion 7 to the detaching portion 62 via the lower arm 50 is raised.

The subframe 1 of the vehicle V according to the embodiment described above includes the subframe body 2 that supports, in the front part of the vehicle, the suspensions disposed below the pair of right and left front side frames 100 (only the left one is shown in FIGS. 2 and 3) extending in the longitudinal direction, and the pair of right and left longitudinal members 3 extending forward from the subframe body 2, the subframe body 2 including the arm front-side supporting portion 17, the fastening unit 63, and the detaching portion 62, the arm front-side supporting portion 17 supporting the front joint portion 55 of the lower arm 50 constituting the suspension, the fastening unit 63 also serving as the arm rear-side supporting portion that supports the rear joint portion 56 of the lower arm 50, the detaching portion 62 serving as detaching means to detach the subframe body 2 from the front side frame 100 at the fastening unit 63 using the load from the subframe 1 moving rearward or the load from the lower arm 50 moving rearward (see FIGS. 1 to 4 and 6), where the bent portion 7 is provided in the rear part of the longitudinal member 3 to be further in the vehicle width direction outer side with respect to the arm front-side supporting portion 17, the longitudinally extending arm 52 extending in the longitudinal direction is provided at the rear part of the lower arm 50, the rear face portion 7*a* of the bent portion 7 and the front face portion 53*a*, which is in the front side, of the longitudinally extending arm 52 of the lower arm 50 extend substantially parallel to each other along the vehicle width direction (see FIGS. 4 and 5), and the reinforcing gusset 21 is provided on the face of the rear face portion 7a, the face opposing the front face portion 53a (see FIGS. 4 to 6).

According to the configuration described above, the subframe 1 has a shape circumventing the power train but achieves both improved rigidity (natural frequency) and improved transferability of head-on collision load (reinforcement of the bent portion 7 and improvement of transferability of the load to the lower arm 50).

According to the configuration described above, a head-on collision load can reliably be received by reinforcing the bent portion 7 by the reinforcing gusset 21, and even if the bent portion 7 deforms and moves rearward by the head-on collision load, the front face portion 53a of the lower arm 50 and the rear face portion 7a of the bent portion 7 abut each other by the faces thereof with the reinforcing gusset 21 provided on the bent portion 7 resisting against the front face portion 53a of the lower arm 50 extending parallel to the vehicle width direction, and thereby the load is transferred to the fastening unit 63 (the arm rear-side supporting portion) via the longitudinally extending arm 52 of the lower arm 50 (see FIG. 6).

Moreover, the reinforcing gusset 21 is provided on a portion of the rear face portion 7a opposing the front face portion 53a, so that the subframe 1 having a shape circumventing the power train still has high rigidity (natural frequency) to suppress resonation of vibration during driving.

The subframe 1 according to the embodiment has the reinforcing gusset 21 disposed substantially horizontal at a position overlapping the front face portion 53a of the lower arm 50 along the up-and-down direction (see FIG. 6).

According to the configuration described above, the weight efficiency of the structure for transferring the collision load to the lower arm 50 can be improved.

In the description above, the term "substantially horizontal" means that the reinforcing gusset 21 is positioned to overlap the front face portion 53a of the lower arm 50 along the up-and-down direction and at an angle within a range of 0 degree to 10 degrees against the horizontal plane. In particular, the angle is preferably 0 degree (horizontal).

Describing the configuration in more detail, even if the bent portion 7 deforms and moves rearward by the head-on collision of the vehicle, the reinforcing gusset 21 provided on the bent portion 7 straightly and directly or indirectly contacts the lower arm 50 provided in the rear side of and at the same height as the reinforcing gusset 21 to transfer the load efficiently.

The reinforcing gusset 21 is disposed substantially horizontal at a position overlapping the front face portion 53a of the lower arm 50 along the up-and-down direction, that is, the reinforcing gusset 21 is disposed at such a position and orientation that the load can be transferred efficiently to the lower arm 50 as described above, so that it is not necessary to form the reinforcing gusset 21 large as in a configuration in which the whole periphery of the arm front-side supporting portion 17 including not only the bent portion 7 but the joint portion 31 is reinforced. The weight efficiency can thus be improved.

In the subframe 1 according to the embodiment, the reinforcing gusset 21 is disposed to be shifted further in the vehicle width direction outer side with respect to the arm front-side supporting portion 17 (see FIGS. 4 and 5).

In this configuration, the reinforcing gusset 21 is disposed to be shifted further in the vehicle width direction outer side with respect to the arm front-side supporting portion 17, so that the reinforcing gusset 21 can be disposed in the vehicle width direction outer side away from the front joint portion 55 of the arm front-side supporting portion 17 and the front face opening 15.

Even if the arm front-side supporting portion 17 is provided further in the front side compared to the related art, for example, provided at a position overlapping, along the longitudinal direction, the knuckle supporting portion 54 of the lower arm 50, the swinging of the lower arm 50 is not hindered by the reinforcing gusset 21 and the degree of freedom of swinging the lower arm 50 can be raised. Moreover in this configuration, the front face opening 15 can be provided as a large service hole extending from the front part of the forward projecting portion 5 to the joint portion 31 as in the embodiment.

In the subframe 1 according to the embodiment, the arm front-side supporting portion 17 and the knuckle supporting portion 54 of the lower arm 50 overlap each other along the longitudinal direction, and the lower arm 50 extends, in the vehicle width direction, to linearly connect the arm front-side supporting portion 17 and the knuckle supporting portion 54 (FIGS. 1, 4, and 5).

In the configuration, the arm front-side supporting portion 17 and the knuckle supporting portion 54 of the lower arm 50 overlap each other (positioned the same) along the longitudinal direction and the vehicle width direction extending arm 51 of the lower arm 50 extends in the vehicle width direction to linearly connect the arm front-side supporting portion 17 and the knuckle supporting portion 54, so that the rigidity for supporting the wheel in the vehicle width direction can further be raised compared to a conventional lower arm that has a substantially bowed shape that is curved and directed rearward and further vehicle width direction inward.

Moreover, it is easy to form the front face portion 53a parallel to the vehicle width direction in the front part of the lower arm 50, and in an event of head-on collision of the vehicle, the rear face portion 7a of the bent portion 7 contacts the front face portion 53a of the lower arm 50 and thus the transferability of the load from the bent portion 7 to the lower arm 50 can be raised.

According to the configuration described above, both the rigidity for supporting the wheel and transferability of the collision load can be achieved.

In more detail, to raise the rigidity for supporting the wheel in the vehicle width direction, it is preferable that the front joint portion 55 and the knuckle supporting portion 54 of the lower arm 50 are disposed along a direction substantially parallel to the vehicle width direction, that is, it is preferable to form the vehicle width direction extending arm 51 of the lower arm 50 into a shape linearly extending along the vehicle width direction.

It is further preferable in view of the rigidity for supporting the wheel in the vehicle width direction that the sus-cross 4 provided in the subframe body 2 has a configuration in which a pair of right and left arm front-side supporting portions 17 is joined along the vehicle width direction.

However, the subframe 1 needs to be configured that the sus-cross 4 is shifted to the rear side to avoid interference with the power train while the arm front-side supporting portions 17 are provided on the forward projecting portion 5 protruding forward at both right and left sides of the sus-cross 4. That is, the subframe 1 inevitably takes a configuration that is disadvantageous in view of the rigidity for supporting the wheel in the vehicle width direction.

Thus, in publicly known subframes, for example, the subframe disclosed in Patent Literature 1 (JP 5949600 B) described above, the arm front-side supporting portion positioned further in the rear side with respect to the supporting portion of the knuckle supports the front part of the lower arm to provide rigidity for supporting the wheel in the vehicle width direction and rigidity for supporting the longitudinal member of the forward projecting portion of the subframe body.

In this configuration in which the arm front-side supporting portion is positioned further in the rear side with respect to the knuckle supporting portion however, there is still a room for improvement not only in view of the rigidity for supporting the wheel but also in view of the efficiency of transferring the collision load in an event of head-on collision of the vehicle from the longitudinal member to the lower arm when the rear end of the longitudinal member, which is axially compressed and deforms to move rearward, contacts the front face of the lower arm since the front face of the lower arm is shaped to incline further in the rear side toward the vehicle width direction inner side.

If the arm front-side supporting portion of the subframe body is positioned further in the front side or the bend angle of the longitudinal member, projecting further in the front side from the forward projecting portion via the joint portion, against the joint portion is further reduced (to be closer to a right angle) to improve rigidity for supporting the wheel or to improve efficiency of transferring the collision load from the longitudinal member to the lower arm in an event of head-on collision of the vehicle without consideration, the rigidity of the forward projecting portion of the subframe body will be reduced.

In view of this problem, the embodiment is configured that the arm front-side supporting portion 17 and the knuckle supporting portion 54 of the lower arm 50 overlap each other along the longitudinal direction and the lower arm 50 extends the vehicle width direction to linearly connect the arm front-side supporting portion 17 and the knuckle supporting portion 54 while the reinforcing gusset 21 is provided on the bent portion 7 to raise the efficiency of the collision load from the bent portion 7 to the lower arm 50. Thus, improvement of the rigidity for supporting the wheel by vehicle width direction linearly extending the lower arm 50 and transferability of the rigidity for supporting the wheel and the collision load can both be achieved.

The subframe 1 according to the embodiment has the recessed bead 8 provided in the middle portion of the longitudinal member 3 to serve as a bend-promoting portion that promotes bending of the longitudinal member 3 to the vehicle width direction inner side (see FIGS. 1 to 3).

According to this configuration, promotion of inward bending of the longitudinal member 3 in an event of small overlap collision and high transferability of a collision load in an event of head-on collision other than the small overlap collision can both be achieved.

In more detail, first, in an event of small overlap collision, the vehicle width direction outer portion of the vehicle width direction outward extending member 13 (see FIG. 1) provided on the front end of the longitudinal member 3 receives a collision load and rotates about the front end supporting member 107 in a plan view to push the longitudinal member 3 from the vehicle width direction outer side to the inner side.

According to this configuration, the recessed bead 8 provided in the middle portion of the longitudinal member 3 becomes the origin of bending deformation of the longitudinal member 3 when the vehicle width direction outward extending member 13 pushes the longitudinal member 3 from the vehicle width direction outer side to the inner side. Thus, the middle portion of the longitudinal member 3 is surely deformed to bend in an event of small overlap collision to absorb the collision load.

Meanwhile, in the embodiment, the rear face portion 7a of the bent portion 7 and the front face portion 53a positioned in the front side of the longitudinally extending arm 52 of the lower arm 50 extend, in the vehicle width direction, substantially parallel to each other along the vehicle width direction and the reinforcing gusset 21 is provided on a portion, opposing the rear face portion 7a, of the front face portion 53a. Thus, in an event of head-on collision of the vehicle, the rear face portion 7a of the bent portion 7 reliably contacts the front face portion 53a of the lower arm 50 via the reinforcing gusset 21, which raises the transferability of the load from the bent portion 7 to the lower arm 50. That is, unlike a configuration in which the load is transferred mainly along the first load transfer path, the load is positively transferred along the second load transfer path running through the lower arm 50. This eliminates the need of excessively raising the bending rigidity of the bent portion 7 and prevents the rigidity of the middle portion of the longitudinal member 3 from becoming excessively small relative to the rigidity of the bent portion 7.

In the description above, the term "substantially parallel" means that the angle between the rear face portion 7a of the bent portion 7 and the front face portion 53a of the lower arm 50 is within the range of 0 degree to 15 degrees. In particular, the angle is preferably 0 degree (parallel to each other).

Accordingly, the difference in rigidity between the middle portion of the longitudinal member 3 and the bent portion 7 provided at the rear end of the longitudinal member 3 can be reduced. Thus, in an event of normal head-on collision, which is not a small overlap collision, the transferred load can be dissipated in the middle portion of the longitudinal member 3 and the bent portion 7 at the rear end of the longitudinal member 3, so that an unexpected bending deformation can be prevented even if the recessed bead 8 is provided in the middle portion, in the longitudinal direction, of the longitudinal member 3.

Exemplary Modification

The present disclosure is not limited to the configuration employed by the embodiment described above. Various exemplary modifications can be made.

For example, although the subframe 1 of the embodiment described above employs the configuration provided with the low-rigidity portion 61, the low-rigidity portion 61 is not a component always necessary in this present disclosure. Such a configuration that is at least provided with detaching means for detaching the subframe body 2 from the front side frame 100 using the load from the subframe 1 moving rearward or the load from the lower arm 50 moving rearward can be employed.

That is, the present disclosure may employ a configuration in which the load transferred along the first load transfer path that runs from the longitudinal member 3 to the forward projecting portion 5, circumventing the lower arm 50, and to the low-rigidity portion 61 is not used in an event of head-on collision but only the load transferred along the second load transfer path that runs from the bent portion 7 to the detaching portion 62 via the lower arm 50 is used to detach the subframe body 2 from the front side frame 100.

In the embodiment described above, detachment from the front side frame 100 is performed by the detaching means in which, in an event of head-on collision, the bolt 65 and the weld nut 66 are pulled out downward and rearward by the so-called principle of leverage using the reference pin 64 of the detaching portion 62 as a fulcrum. The present disclosure is not limited to this configuration. For example, guiding means that guides, in an event of head-on collision, the fastening members (the bolt 65 and the weld nut 66) to urge the fastening members to push down the subframe 1 as the fastening member receiving the transferred load moves can be employed. The drawing of this configuration is omitted.

In the embodiment described above, the reinforcing gusset 21 is employed as an example reinforcing portion, but the present disclosure is not limited to such a configuration. For example, the reinforcing portion may be provided by partially using a high-strength member or injecting a reinforcing material inside a closed cross-section.

Summary of Present Disclosure

A front subframe structure according to an aspect of the present disclosure includes a subframe body that supports, in a front part of a vehicle, suspensions disposed below a pair of right and left front side frames each extending in a longitudinal direction of the vehicle, and a pair of right and left longitudinal members each extending forward from the subframe body.

The subframe body includes an arm front-side supporting portion, an arm rear-side supporting portion, and a detaching portion, the arm front-side supporting portion and the arm rear-side supporting portion supporting a front part and a rear part of a lower arm constituting the suspensions, the detaching portion detaching the subframe body from each of the front side frames using a load from a subframe moving rearward or a load from the lower arm moving rearward.

Each of the longitudinal members includes a bent portion provided at a rear part of the longitudinal member and further in an outer side along a vehicle width direction outer side with respect to the arm front-side supporting portion.

The lower arm has a longitudinally extending portion extending in the longitudinal direction which is provided in a rear part of the lower arm.

A rear face portion of the bent portion and a front face portion which is in a front side of the vehicle of the longitudinally extending portion of the lower arm extend substantially parallel to each other along the vehicle width direction.

A reinforcing portion is provided on a face of the rear face portion of the bent portion, the face opposing the front face portion of the longitudinally extending portion.

According to the aspect described above, the subframe has a shape circumventing a power train but achieves both improved rigidity (natural frequency) and improved transferability of head-on collision load (reinforcement of the bent portion and improvement of transferability of the load to the lower arm).

In the aspect above, the term "substantially parallel" means that the angle between the rear face portion of the bent portion and the front face portion of the lower arm is within a range of 0 degree to 15 degrees. In particular, the angle is preferably 0 degree (parallel to each other). The same can be said in the present disclosure.

A front subframe structure according to another aspect of the present disclosure may have the reinforcing portion disposed substantially horizontal at the position overlapping the front face portion of the lower arm along the up-and-down direction.

According to the aspect described above, the weight efficiency of the structure for transferring a collision load to the lower arm can be improved.

In the aspect above, the term "substantially horizontal" means that the reinforcing portion is positioned to overlap the front face portion of the lower arm along the up-and-down direction and at an angle within a range of 0 degree to 10 degrees against the horizontal plane. In particular, the angle is preferably 0 degree (horizontal). The same can be said in the present disclosure.

A front subframe structure according to another aspect of the present disclosure may have the reinforcing portion disposed further in the vehicle width direction outer side with respect to the arm front-side supporting portion.

According to the aspect, the weight efficiency and the degree of freedom of swinging the arm can be improved.

A front subframe structure according to another aspect of the present disclosure may have the arm front-side supporting portion and a knuckle supporting portion of the lower arm overlapping each other along the longitudinal direction with the lower arm extending in the vehicle width direction so as to linearly connect the arm front-side supporting portion and the knuckle supporting portion.

According to this aspect, rigidity for supporting the wheel and transferability of the collision load can both be achieved.

A front subframe structure according to another aspect of the present disclosure may have a bend-promoting portion provided in the middle portion of the longitudinal member to promote inward bending along the vehicle width direction.

According to this aspect, the longitudinal member is promoted to bend inward in an event of small overlap collision and at the same time high transferability of collision load in an event of head-on collision other than the small overlap collision can be achieved.

As described above, each of the aspects of the present disclosure provides a subframe having a shape circumventing the power train but having both improved rigidity (natural frequency) and improved transferability of head-on collision load.

The invention claimed is:

1. A front subframe structure comprising:
a subframe body that supports, in a front part of a vehicle, suspensions disposed below a pair of right and left front side frames each extending in a longitudinal direction of the vehicle; and
a pair of right and left longitudinal members each extending forward from the subframe body, wherein
the subframe body includes an arm front-side supporting portion, an arm rear-side supporting portion, and a detaching portion, the arm front-side supporting portion and the arm rear-side supporting portion supporting a front part and a rear part of a lower arm constituting the suspensions, the detaching portion detaching the subframe body from each of the front side frames at the arm rear-side supporting portion using a load from a subframe moving rearward or a load from the lower arm moving rearward,
each of the longitudinal members includes a bent portion provided at a rear part of the longitudinal member and further in an outer side along a vehicle width direction with respect to the arm front-side supporting portion,
the lower arm has a longitudinally extending portion extending in the longitudinal direction which is provided in a rear part of the lower arm,
a rear face portion of the bent portion, and a front face portion which is in a front side of the vehicle of the longitudinally extending portion of the lower arm extend substantially parallel to each other along the vehicle width direction, and a reinforcing portion is provided on a face of the rear face portion of the bent portion, the face opposing the front face portion of the longitudinally extending portion.

2. The front subframe structure according to claim 1, wherein
the reinforcing portion is disposed substantially horizontal at a position overlapping the front face portion of the lower arm along an up-and-down direction.

3. The front subframe structure according to claim 1, wherein
the reinforcing portion is disposed to be shifted further in the outer side along the vehicle width direction with respect to the arm front-side supporting portion.

4. The front subframe structure according to claim 1, wherein
the arm front-side supporting portion and a knuckle supporting portion of the lower arm overlap each other along the longitudinal direction with the lower arm extending in the vehicle width direction so as to linearly connect the arm front-side supporting portion and the knuckle supporting portion.

5. The front subframe structure according to claim 1, wherein
a bend-promoting portion is provided in a middle portion of the longitudinal member to promote inward bending along the vehicle width direction.

6. The front subframe structure according to claim 2, wherein
the reinforcing portion is disposed to be shifted further in the outer side along the vehicle width direction with respect to the arm front-side supporting portion.

7. The front subframe structure according to claim 2, wherein
the arm front-side supporting portion and a knuckle supporting portion of the lower arm overlap each other along the longitudinal direction with the lower arm extending in the vehicle width direction so as to linearly connect the arm front-side supporting portion and the knuckle supporting portion.

8. The front subframe structure according to claim 2, wherein
a bend-promoting portion is provided in a middle portion of the longitudinal member to promote inward bending along the vehicle width direction.

9. The front subframe structure according to claim 3, wherein
the arm front-side supporting portion and a knuckle supporting portion of the lower arm overlap each other along the longitudinal direction with the lower arm extending in the vehicle width direction so as to linearly connect the arm front-side supporting portion and the knuckle supporting portion.

10. The front subframe structure according to claim 3, wherein
a bend-promoting portion is provided in a middle portion of the longitudinal member to promote inward bending along the vehicle width direction.

11. The front subframe structure according to claim 4, wherein
a bend-promoting portion is provided in a middle portion of the longitudinal member to promote inward bending along the vehicle width direction.

\* \* \* \* \*